Figure 1:
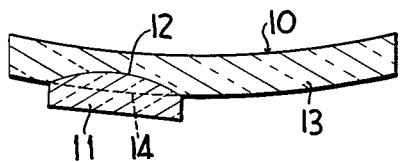

Feb. 13, 1962    J. E. DUNCAN ET AL    3,020,803
MULTIFOCAL LENS
Filed May 13, 1958

INVENTORS
JAMES E. DUNCAN and
SAMUEL L. SEYMOUR
BY Oscar L. Spencer
ATTORNEY 3,020,803
MULTIFOCAL LENS
James E. Duncan, Brackenridge, and Samuel L. Seymour, Oakmont, Pa., assignors to Pittsburgh Plate Glass Company, Allegheny County, Pa., a corporation of Pennsylvania
Filed May 13, 1958, Ser. No. 734,847
3 Claims. (Cl. 88—54)

This invention relates to an ophthalmic glass and it has particular relation to a glass having a relatively high softening point and a high index of refraction so as to be useful as the segment in a particular method of forming a multifocal, ophthalmic lens.

A multifocal lens is conventionally composed of two different ophthalmic glasses. A major portion of the lens is composed of a crown glass or other glass which has a relatively low index of refraction and which is highly refined and free from seeds, striae and other imperfections which would impair the optical properties of the lens. The crown glass has a ground and polished recess in it and a glass in the form of a small segment is fused in the recess. The segment glass has a higher index of refraction than the crown glass and it is the portion of the fused multifocal lens which is used for reading.

One example of a crown glass is an alkali-lime silica glass containing approximately 70 percent $SiO_2$, 8.5 percent $Na_2O$, 7.5 percent $K_2O$, 12 percent $CaO$ and 2 percent refining agents such as $Sb_2O_3$. The segment is usually made from highly refined glasses known as barium, flint, barium-flint or barium crown glasses. Examples of these glasses are shown in U.S. Patents Nos. 2,523,264, 2,523,265, 2,523,266 and 2,528,634. The crown glass and the segment glass preferably have substantially the same coefficient of thermal expansion. The barium type glasses usually have a slightly lower softening point than the crown glasses and the flint glasses usually have a softening point considerably lower than the crown glasses.

In the manufacture of a multifocal lens, a processed, segment blank is fused to a processed major blank. The major blank and the segment blank are made in a great variety of shapes and sizes by the glass manufacturers. These blanks are semi-finished by the various lens processing companies and are usually assembled in the manner hereinafter described. The face of the segment blank to be engaged by the major blank is ground and polished to stock minor focal fields usually expressed in diopters. A suitable polished depression or countersink is formed in the major blank to receive the segment. The segment is placed in the depression and the assembly is heated to fuse the segment glass to the glass used for the major blank. Thereafter, the fused bifocal blank is ground and polished on both sides to form a semi-finished lens.

The perimeter of the segment blank is not always of circular form. Frequently, it is in the form of a semi-circle, rectangle or modification thereof. The various shapes make it difficult to form correspondingly shaped segment receiving depressions in the major blank. One usual practice is to grind and polish in the major blank a circular depression which is large enough to receive the segment. Any remaining portion of the depression surrounding the segment is filled with smaller shaped portions of crown glass which are fused to the segment prior to fusion of the segment in the depression. The whole assembly is then fused together so that only the segment is visible apart from the major portion of the lens when the lens is ground and polished.

When assembling the segment in the depression of the major portion of the lens, great care must be exercised to maintain the face of the depression and the engaging face of the segment free from lint, dust, finger marks and other foreign matter. Likewise, great care must also be exercised to avoid entrapping air between the segment face and the bottom of the depression. One general practice is to make the face of the segment of a slightly different curvature than the depression so that upon heating to fuse the major portion of the lens and segment together, the segment glass will flow into the exact curvature of the depression and the entrapped air will escape during this heating. Another general practice is to assemble the major portion of the lens and the segment with one side of the segment slightly elevated by the introduction of a small glass or wire wedge between the segment and the major portion of the lens. The assembly is heated to a temperature such that the segment glass softens, settles and fuses within the depression and in so doing, pushes the air out of the interspace between the elements, the fusing taking place gradually from one side of the depression to the other. All of these methods involve the use of the conventional crown and segment glasses mentioned above.

A novel method of forming a multifocal lens blank is disclosed in an application of Samuel L. Seymour, Serial No. 688,560, filed October 7, 1957. In this process, a mold is used which conforms to the shape of the multifocal lens blank and which has a recess or countersink of configuration which is complementary to the segment. The segment, having an optically finished surface on one side thereof, is preheated to a temperature below its softening point and placed within the recess or countersink with its finished surface facing upwardly. Molten glass of optical quality to form the major portion of the multifocal lens blank is then fed from a glass furnace discharge orifice onto the mold surface in such a manner that the molten glass does not contact the preformed segment but has a part of its perimeter in close proximity thereto. A molten mass of glass is allowed to accumulate in the mold and the feed is stopped. Immediately thereafter, the accumulated mass of molten glass is laterally pushed so as to flow over the mold surface and the finished surface of the heated segment. In so doing, the molten glass fuses to the segment without the entrapment of air at the interface or area of fusion. Subsequently, if necessary or desirable, the distributed mass, while still in its molten condition, may be subjected to a vertically directed pressing with a suitably shaped molding member to further complete the shaping of the composite multifocal lens blank.

Figure 2:
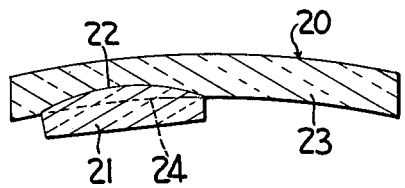

FIG. 1 is a sectional view of one form of a fused composite lens blank for making a multifocal, ophthalmic lens of the present invention and FIG. 2 is a sectional view of another form of the fused composite lens blank.

The different forms of composite lens blanks illustrated in FIGS. 1 and 2 are generally indicated at 10 and 20, respectively. The lens blank 10 comprises a minor segment 11 which is composed of the glass of the present invention and which has facing upwardly the optically finished surface 12 to which is fused a major element 13 of crown glass or other suitable glass conventionally forming the major portion of a multifocal lens. The dotted line 14 indicates the line to which segment 11 is removed by grinding and polishing to provide the multifocal lens. Similarly lens blank 20 has a minor segment 21 of a glass of the present invention and to its upwardly facing optically finished surface 22 is fused a major element 23 which may be of crown glass or other suitable glass. The dotted line 24 indicates the eventual surface of element 21 after the grinding and polishing of the lens blank. In the lens blank of FIG. 1 the minor segment using the glass of the present invention is on the convex side of the major element whereas in FIG. 2 it is on the concave side side of the major element.

This novel method of manufacture of a multifocal lens blank requires the use of a segment glass having a softening point which is much higher than that of the high index, segment glasses which are used in the conventional processes described above. The segment glass which is employed in the novel method should have a softening point which is higher, for example, 100 to 150° F. or more than the softening point of the glass which forms the major portion of the multifocal lens in order to avoid distortion of the finished curved surface of the segment during fusing of the molten major portion glass to the segment.

The present invention is concerned with providing a glass for use as the segment glass in the novel method of manufacture of multifocal lens blanks as described above, which glass has a relatively high softening point, i.e., from 1385° F. to 1475° F., an index of refraction, $N_d$, between 1.57 and 1.67, a high reciprocal dispersion ranging from 40 to 56 and a coefficient of expansion which is compatible with the glass of the major portion of the lens within the range of 7 to $10 \times 10^{-6}$ per ° C. between 25° C. and 300° C. Novel glasses within the purview o fthe invention are prepared by the use of conventional glass making materials in conventional, ophthalmic glass manufacturing equipment. The following batches in pounds and compositions in calculated percent by weight produced therefrom are exemplary of the glasses of the invention:

are thoroughly mixed in the proportions necessary to produce the glasses. Various size pots or crucibles may be employed and the temperatures and times will vary according to the amount of glass being formed. The temperatures and melting conditions herein recited are employed to make 85 to 100 pounds of these glasses in clay pots in a furnace heated by the controlled combustion of natural gas.

The empty pot is preheated in the furnace at a furnace temperature of about 2200° F. A portion of the mixed batch is ladled into the preheated pot and the furnace temperature is gradually increased. The remaining portion of the mixed batch is ladled into the pot at a uniform rate over a period of 3½ hours and the temperature is raised gradually during this period to about 2600° F. During the next ½ hour the furnace temperature is further increased to between 2650 and 2670° F. and within this time substantially all of the glass making materials are melted. This temperature is maintained for the following 1½ hours during which time the chemical reactions are completed and the glass becomes substantially free of bubbles. During the melting and high temperature reacting periods just described a neutral or slightly oxidizing atmosphere is maintained within the furnace.

BATCHES

| Ingredients | Pounds | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Sand | 956 | 968 | 968 | 920 | 956 | 1135 | 956 | 780 | 788 | 788 | 715 | 788 | 716 |
| Barium Carbonate | 908 | 939 | 939 | 939 | 908 | 900 | 908 | 908 | 939 | 877 | 877 | 939 | 939 |
| Sodium Carbonate | 204 | 174 | 174 | 174 | 174 | | 200 | 263 | 277 | 298 | 277 | 277 | 277 |
| Potassium Carbonate | 130 | 107 | 107 | 107 | 130 | 280 | 130 | | | 12 | | 12 | 12 |
| Calcium Carbonate | 151 | 237 | | 151 | 151 | 157 | 268 | | | 86 | 237 | 237 | |
| Zinc Oxide | 80 | 80 | 213 | 128 | 80 | 122 | | | | 58 | | | |
| Lead Oxide | 48 | | | | 48 | | 48 | 167 | 167 | 109 | 80 | 32 | 167 |
| Titanium Dioxide | 26 | 41 | 41 | 41 | 26 | | 26 | 112 | 88 | 88 | 88 | 88 | 88 |
| Zirconium Silicate | 255 | 218 | 218 | 218 | 255 | 107 | 255 | 403 | 403 | 403 | 477 | 403 | 403 |
| Sodium Nitrate | 30 | 100 | 100 | 100 | 15 | | 15 | 100 | 100 | 100 | 100 | 100 | 100 |
| Antimony Trioxide | 15 | | | | | 15 | | | | | | | |
| Arsenic Trioxide | | 15 | 15 | 15 | 15 | | 30 | 15 | 15 | 15 | 15 | 15 | 15 |
| Aluminum Hydrate | | | | 73 | | | | | | | | | 110 |
| Calcium Fluoride | | | | | | 63 | | | | | | | |
| Sodium Silico Fluoride | | | | | | | | | 24 | | | | |

| Component | Composition | | | | | | | | | | | | | Preferred Range |
|---|---|---|---|---|---|---|---|---|---|---|---|---|---|---|
| | 1 | 2 | 3 | 4 | 5 | 6 | 7 | 8 | 9 | 10 | 11 | 12 | 13 | |
| $SiO_2$ | 43.9 | 43.6 | 43.6 | 41.6 | 44.3 | 49.0 | 43.9 | 38.7 | 38.8 | 38.7 | 36.8 | 38.8 | 35.5 | 35-52 |
| $BaO$ | 29.5 | 30.5 | 30.5 | 30.5 | 29.8 | 28.1 | 29.6 | 29.4 | 30.5 | 28.4 | 28.5 | 30.5 | 30.3 | 28.1-34 |
| $Na_2O$ | 5.5 | 5.8 | 5.8 | 5.8 | 4.5 | | 5.1 | 8.3 | 8.3 | 8.8 | 8.3 | 8.3 | 8.3 | 0-12 |
| $K_2O$ | 3.6 | 3.0 | 3.0 | 3.0 | 3.7 | 7.8 | 3.7 | | | .3 | .3 | .3 | .3 | 0-10 |
| $CaO$ | 3.5 | 5.5 | | 3.5 | 3.6 | 5.5 | 6.3 | | | 2.0 | 5.6 | 5.6 | | 0-10 |
| $ZnO$ | 3.4 | 3.4 | 8.9 | 5.4 | 3.4 | 5.1 | | | | 2.0 | | | | 0-10 |
| $PbO$ | 2.0 | | | | 2-0 | | 2.0 | 6.9 | 6.9 | 4.9 | 3.3 | 1.3 | 7.0 | 0-10 |
| $ZrO_2$ | 7.0 | 5.9 | 5.9 | 5.9 | 7.0 | 2.9 | 7.0 | 10.0 | 10.9 | 10.9 | 12.9 | 10.9 | 10.9 | 2-15 |
| $TiO_2$ | 1.1 | 1.7 | 1.7 | 1.1 | 1.1 | | 1.1 | 4.7 | 3.7 | 3.7 | 3.7 | 3.7 | 3.7 | 0-5 |
| $As_2O_5$ | | .6 | .6 | .6 | .6 | .6 | | .6 | .6 | .6 | .6 | .6 | | 0-2 |
| $Sb_2O_5$ | .6 | | | | | 1.0 | 1.3 | | | | | | 1.0 | 0-2 |
| $F_2$ | | | | | | | | .5 | | | | | | 0-1.5 |
| $Al_2O_3$ | | | | 2.0 | | | | | | | | | 3.0 | 0-5 |
| Index of Refraction $N_D$ | 1.618 | 1.618 | 1.614 | 1.618 | 1.616 | 1.590 | 1.620 | 1.659 | 1.655 | 1.656 | 1.655 | 1.645 | 1.660 | 1.57-1.67 |
| Coeff. of expansion $\times 10^{-6}$ per ° C. between 25° C. and 300° C. | 9.0 | 9.2 | 8.6 | 8.7 | 8.5 | 8.5 | 8.9 | 8.5 | 8.8 | 8.5 | 8.6 | 8.6 | 8.4 | 7.0-10.0 |
| Softening point, ° F. (temp. at which the log of the vis. in poises is $10^{7.6}$) | 1,389 | 1,385 | 1,385 | 1,395 | 1,422 | 1,430 | 1,406 | 1,396 | 1,403 | 1,421 | 1,444 | 1,445 | 1,437 | 1,385-1,475 |
| Reciprocal Dispersion $\left(\frac{N_D-1}{N_F-N_C}\right)$ | 49.8 | 50.7 | 50.2 | 50.1 | 50.5 | 54.6 | 49.0 | 42.4 | 43.2 | 44.2 | 45.2 | 46.1 | 42.6 | 40-56 |

The softening point recited in the table is defined as the temperature in degrees Fahrenheit at which the viscosity of the glass is $10.^{7.6}$ poises. This viscosity is obtained according to the method described on pages 228 to 231 of the 1957 Supplement to the Book of ASTM Standards, a publication of the American Society for Testing Materials, copyright 1958.

In the preparation of the glasses, the batch ingredients

After the glass has become substantially free of bubbles, the temperature of the furnace is gradually lowered in about ¾ of an hour to about 2075° F. A furnace temperature of about 2075° F. is then maintained for a period of about ½ hour. The pot of glass is then removed from the furnace, the glass is poured on a metal table and is rolled into the form of a sheet. The sheet is placed in a kiln and cooled from 1050° F. to 850° F. at a rate of about 5° F. per minute. Thereafter, it is cooled more rapidly at room temperature and cut into pieces suitable for preliminary property tests.

This glass may be further refined to improve its optical quality. The glass is broken into cullet and about 15 pounds is placed in a platinum lined clay crucible which has been preheated to a temperature of about 2000° F. The crucible and contents are placed in an electrically heated furnace which is at a temperature of about 2200° F. The furnace temperature is gradually raised at a uniform rate to about 2670° F. over a period of about 2½ hours. This temperature is maintained for a period of about 1½ hours during which time the bubbles are substantially eliminated from the melt.

At the end of this period, a platinum stirrer is inserted in the molten glass. The glass is stirred while the temperature of the furnace is gradually reduced over a period of ¾ hour to a temperature of 2075° F. A furnace temperature of 2075° F. is maintained for a period of ½ hour while stirring is continued. The stirrer is then removed from the glass and the crucible is removed from the furnace. The glass is poured on a metal table and rolled into the form of a sheet. The sheet is placed in a kiln and cooled from 1050 to 850° F. at a rate of about 5° F. per minute. Thereafter it is cooled more rapidly to room temperature and cut into pieces suitable for processing according to conventional techniques into segments.

In the manufacture of the glasses of the invention, silica is the principal glass former. If lower than 35 percent by weight of $SiO_2$ is employed in the composition it tends to reduce the chemical durability of the glass, whereas amounts higher than 52 percent by weight of $SiO_2$ make it increasingly difficult to achieve a glass having a high index of refraction.

The total of the alkali metal oxides, $Na_2O$ and $K_2O$, is maintained between 6 and 12 percent by weight. A minimum amount of alkali metal oxide is required to achieve the desired coefficient of expansion, but an excess is to be avoided for it has a deleterious effect on the chemical durability of the glass and it also lowers the softening point. It is desired that no lithia be present in the glasses of the invention, for lithia greatly lowers the softening point of the glasses.

A relatively large amount of barium oxide is desired to achieve the high index of refraction, but too much barium oxide causes the glasses to devitrify. Careful selection and control of the other ingredients of the glasses permits the use of the high amount of barium oxide to obtain the unusually high softening point and prevent devitrification of the glasses of the invention. Calcium oxide, zinc oxide and lead oxide are present to provide the required properties and prevent devitrification. Cadmium oxide and strontium oxide may also be used for this purpose. Any one or combination of the oxides of calcium, zinc, lead, cadmium and strontium in an amount between 5 to 15 percent by weight is suitable.

Zirconium dioxide is necessary to produce a glass having a high softening point; however, an excess of zirconium dioxide undesirably reduces the coefficient of expansion of the glass. About 0.5 to 5 percent by weight of titanium dioxide may be used to control the refractive index of the glass. Its use is restricted to less than about 5 percent because it lowers the reciprocal dispersion unduly. No boron oxide is present in the glasses of the invention. It has been found that a combination of $B_2O_3$ and the relatively high amount of BaO present in the glasses of the invention adversely affects their chemical durability.

Approximately 95 or more percent by weight of the glasses which are the subject of this invention is comprised of $SiO_2$, BaO, $ZrO_2$, $Na_2O$, $K_2O$ and one or more bivalent metal oxides selected from the group consisting of CaO, ZnO, PbO, CdO and SrO. The remaining approximately 5 percent or less by weight of the glasses may be made up of $TiO_2$, fining agents, melting aids and other materials such as colorants which may affect the transmission, absorption or other properties of the glasses without unduly lowering their softening point or harmfully affecting their other desirable optical properties.

For example, fluorine may be present to act as an aid in refining the glass at high temperatures. Its use is restricted to less than about 1.5 percent by weight because when used in larger amounts objectionable opalescence forms in the glass due to precipitation of fluoride crystals in the body of the glass. Aluminum oxide may also be included in the glasses to help obtain the high softening point. Its use is limited to less than about 5 percent by weight because higher amounts have a tendency to cause the glasses to devitrify. The oxides of antimony and arsenic are added as conventional fining agents and other oxides or other compounds which act by themselves or collectively as fining agents may be employed in the practice of the invention.

The glasses of the invention may be utilized as segments in the novel process described in the previously mentioned application of Samuel L. Seymour in combination with conventional crown glasses and preferably with special low softening point crown glasses containing 62 to 66 percent $SiO_2$, 0 to 15 percent $Na_2O$, 0 to 15 percent $K_2O$, the sum total of alkali metal oxides being 12 to 17 percent, 15.2 to 20 percent PbO, 0.5 to 4 percent $TiO_2$ and 0.5 to 3 percent $Al_2O_3$ as disclosed in another copending application of Samuel L. Seymour, Serial No. 538,516, filed October 4, 1955, now abandoned. The composition of an example of such a glass is 65.0 percent $SiO_2$, 5.3 percent $Na_2O$, 9.3 percent $K_2O$, 18.6 percent PbO, 0.5 percent $TiO_2$, 0.5 percent $Al_2O_3$ and 0.8 percent $Sb_2O_5$. These crown glasses have a coefficient of expansion between about 7 to $10 \times 10^{-6}$ per ° C. between 25 and 300° C., an index of refraction between 1.520 and 1.540 and a softening point of about 1125 to 1250° F. The softening point of the segment glass should be at least 100° F. or more above the softening point of the crown glass and it is preferred that the softening point of the segment glass be from 135 to 350° F. or more above the softening point of the crown glass when utilized in the novel process.

In the manufacture of the multifocal lens blanks according to the novel process, the blank mold is heated to a temperature of about 700 to 800° F. A segment glass having a composition as set forth in glass No. 1 of the table and having an optically finished surface is preheated to a temperature of about 1250 to 1300° F. and placed within a recess or countersink within the heated mold with its finished surface facing upwardly. Molten crown glass of optical quality made according to conventional continuous optical glass manufacturing techniques is simultaneously deposited onto the mold surface in such a manner that the molten glass does not contact the preformed segment, but has a part of its perimeter in close proximity thereto. This glass may have a composition the same as that of the exemplary glass set forth in the preceding paragraph. A molten mass of glass is allowed to accumulate in the mold and the feed is then stopped. The temperature of the molten glass is about 1875 to 1975° F. Immediately thereafter the accumulated mass of molten glass is laterally pushed by a molding member heated to a temperature of about 700 to 800° F. so as to flow the glass over the mold surface and the finished surface of the minor segment and to fuse to the segment without the entrapment of air at the interface or area of fusion. The molding member is then vertically impressed on the molten glass to further shape the multifocal lens blank. The blank is removed from the mold and cooled slowly in an annealing lehr from a temperature of 1050 to 850° F. at a rate of 5° F. per minute. The multifocal lens blank may then be ground and polished according to conventional opthalmic procedures to a finished lens suitable for incorporation in spectacles.

Although the present invention has been described with reference to specific details of certain embodiments thereof, it is not intended that such details shall be regarded as limitations upon the scope of the invention except insofar as set forth in the following claims. This application is a continuation-is-part of our copending application Serial No. 478,518, filed December 29, 1954, now abandoned.

We claim:

1. A multifocal lens comprising a major glass portion of the lens having a segment glass portion fused thereto, the segment being composed of a boron-free and lithia-free glass having an index of refraction, $N_d$, between 1.57 and 1.67, a softening point above 1385° F. and a coefficient of thermal expansion of 7 to $10 \times 10^{-6}$ per ° C. between 25 and 300° C. which consists essentially of the following ingredients in percent by weight: 35 to 52 percent $SiO_2$, 0 to 12 percent $Na_2O$, 0 to 10 percent $K_2O$, the sum of $Na_2O$ and $K_2O$ being 6 to 12 percent, 28.1 to 34 percent BaO, 2 to 15 percent $ZrO_2$, 0 to 10 percent CaO, 0 to 10 percent ZnO and 0 to 10 percent PbO, the sum of CaO, ZnO and PbO being 5 to 15 percent, the above listed essential ingredients constituting at least 95 percent by weight of the glass, and the major portion of the lens being composed of a crown glass having an index of refraction between 1.520 and 1.540, a coefficient of expansion of 7 to $10 \times 10^{-6}$ per ° C. between 25 and 300° C. and a softening point which is at least 100° F. lower than the softening point of the segment glass.

2. A multifocal lens as described in claim 1 wherein the segment glass contains 0.5 to 5 percent $TiO_2$.

3. A multifocal lens comprising a major glass portion of the lens having a segment glass portion fused thereto, the segment being composed of a boron-free and lithia-free glass having an index of refraction, $N_d$, between 1.57 and 1.67, a softening point above 1385° F. and a coefficient of thermal expansion of 7 to $10 \times 10^{-6}$ per ° C. between 25 and 300° C. which consists essentially of the following ingredients in percent by weight: 35 to 52 percent $SiO_2$, 0 to 12 percent $Na_2O$, 0 to 10 percent $K_2O$, the sum of $Na_2O$ and $K_2O$ being 6 to 12 percent, 28.1 to 34 percent BaO, 2 to 15 percent $ZrO_2$, 0 to 10 percent CaO, 0 to 10 percent ZnO and 0 to 10 percent PbO, the sum of CaO, ZnO and PbO being 5 to 15 percent, the above listed ingredients constituting at least 95 percent by weight of the glass, and the major portion of the lens being composed of a crown glass having an index of refraction between 1.520 and 1.540, a coefficient of expansion of 7 to $10 \times 10^{-6}$ per ° C. between 25 and 300° C. and a softening point of 1125 to 1250° F. which consists essentially of the following ingredients in percent by weight: 62 to 66 percent $SiO_2$, 0 to 15 percent $Na_2O$, 0 to 15 percent $K_2O$, the sum total of alkali metal oxides being 12 to 17 percent, 15.2 to 20 percent PbO, 0.5 to 4 percent $TiO_2$ and 0.5 to 3 percent $Al_2O_3$.

References Cited in the file of this patent

UNITED STATES PATENTS

| | | |
|---|---|---|
| 1,990,126 | Laabs | Feb. 5, 1935 |
| 2,699,399 | Armistead | Jan. 11, 1955 |
| 2,702,749 | Hafner et al. | Feb. 22, 1955 |
| 2,807,122 | Upton | Sept. 24, 1957 |

UNITED STATES PATENT OFFICE
CERTIFICATE OF CORRECTION

Patent No. 3,020,803                      February 13, 1962

James E. Duncan et al.

It is hereby certified that error appears in the above numbered patent requiring correction and that the said Letters Patent should read as corrected below.

Column 2, line 69, strike out "side", second occurrence; columns 3 and 4, second table, "Composition 4", ninth item, for "1.1" read -- 1.7 --; same table, "Composition 5", seventh item, for "2-0" read -- 2.0 --; same table, "Composition 6", the components and amounts, items 10 to 14, should read as follows:

| | |
|---|---|
| $As_2O_5$ | ----- |
| $Sb_2O_5$ | .6 |
| $F_2$ | 1.0 |
| $Al_2O_3$ | ----- |
| Index of Refraction $N_D$ | 1.590 | column 3, line 70, for "10.$^{7.6}$" read -- $10^{7.6}$ --; column 5, line 2, for "at" read -- to --.

Signed and sealed this 6th day of November 1962.

(SEAL)
Attest:

ERNEST W. SWIDER                      DAVID L. LADD
Attesting Officer                   Commissioner of Patents